United States Patent

Toepel et al.

[15] 3,673,558

[45] June 27, 1972

[54] POLYADDITION PRODUCTS AND PROCESS FOR THEIR MANUFACTURE

[72] Inventors: Rosemarie Toepel, Basel; Heinz Abel, Reinach; Arthur Maeder, Therwil; Klaus-Dieter Leifels, Binningen, all of Switzerland

[73] Assignee: Ciba Limited, Basel, Switzerland

[22] Filed: May 4, 1970

[21] Appl. No.: 34,596

[52] U.S. Cl. .................................. 260/29.2 EP, 8/18, 117/141, 117/143 A, 117/155 R, 117/161 ZB, 162/164, 260/47 EN, 260/59, 260/78.4 EP, 260/834
[51] Int. Cl. .................................................. C08g 51/24
[58] Field of Search ............... 260/47 EN, 29.2 EP, 59, 2 EN, 260/2 EP, 78.4 EP

[56] References Cited

UNITED STATES PATENTS 2,909,448 10/1959 Schroeder ........................... 260/2 EP
3,449,281 6/1969 Sullivan et al. .................... 260/29.2 EP

*Primary Examiner*—William H. Short
*Assistant Examiner*—T. Pertilla
*Attorney*—Harry Goldsmith, Joseph G. Kolodny and Mario A. Monaco

[57] ABSTRACT

A stable preparation of reaction products is provided which is prepared by first reacting a liquid polyglycidyl ether of a polyphenol with an aliphatic di-primary diamine and thereafter further reacting the resulting adduct with an epoxy compound. The ratio of epoxide group equivalents to amino group equivalents in the first stage is 1:3 to 5.5 and in the second stage 1:2 to 5. The preparations are useful in the textile industry e.g. for rendering wool non-felting. Especially suitable are the preparations when applied in combination with a dyeing process.

13 Claims, No Drawings

POLYADDITION PRODUCTS AND PROCESS FOR THEIR MANUFACTURE

It has been found that valuable new stable preparations of reaction products of epoxides and amines are obtained if (1) polyglycidyl ether of a polyphenol, which is liquid at room temperature, is reacted with (2) an aliphatic di-primary diamine, in a ratio of 1 epoxide group equivalent to 3 – 5.5 amino group equivalents, in the absence of solvents, at temperatures of 100° to 120° C, the resulting adduct is thereafter allowed to react further, at temperatures below 100° C, in the presence of an organic solvent, with (3) an epoxy compound in a ratio of 1 epoxide group equivalent to 2 – 5, preferably 3 – 5, amino group equivalents, and provision is made, through the addition of acid, not later than after completion of the reaction, that a sample of the reaction mixture has a pH-value of 2 to 8, preferably 2 to 7, after dilution with water.

The polyglycidyl ethers (1) which are liquid at room temperature, that is to say maximally 25° C, are derived from polyhydric phenols or polyphenols, such as resorcinol, phenol-formaldehyde condensation products of the type of the resols or novolaks, bis-(p-hydroxyphenyl)-methane and especially 2,2-bis-(4'-hydroxyphenyl)-propane (=diomethane).

Polyglycidyl ethers to be especially mentioned here are the polyglycidyl ethers of 2,2-bis-(4'-hydroxyphenyl)-propane which are liquid at room temperature, have an epoxide content of 3.8 to 5.8 epoxide group equivalents/kg, but preferably at least 5 epoxy group equivalents/kg, and correspond to the formula (1)

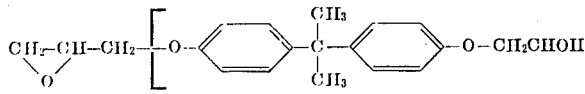 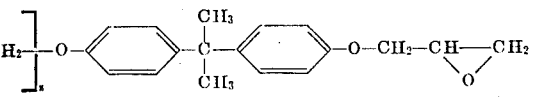

wherein $z$ denotes an average number having a value of 0 to 0.65.

Preferably, the aliphatic di-primary diamines (2) contain 2 to 14 carbon atoms. Cycloaliphatic or cycloaliphaticaliphatic di-primary diamines in which at least one of the primary amino groups is bonded to a cycloaliphatic ring carbon atom, are of especial interest.

Possible di-primary diamines (2) for the reaction with the polyglycidyl ethers (1) are especially those which apart from the two amine nitrogen atoms only contain carbon and hydrogen, and which possess a saturated carbocyclic ring, a $H_2N-$ group bonded to a ring carbon atom, and a $H_2N-CH_2-$ group bonded to another ring carbon atom. As examples of such diamines, 1-amino-3-aminomethyl-3,5,5-trimethyl-cyclohexane (isophorone-diamine), 1-amino-2-aminomethyl-cyclopentane and 4,4'-diamino-dicyclohexylmethane may be mentioned. In addition it is also possible to use acyclic aliphatic diamines such as ethylenediamine, propylenediamine or triethylenetetramine.

According to the invention, the amounts of the reagents are to be so chosen in the first reaction stage of the present process that a ratio of 1 epoxide group equivalent to 3 – 5.5 amino group equivalents prevails, that is to say the amount of polyglycidyl ether (1) corresponding to q epoxide group equivalents/kg is to be reacted with 1.5 q mols to 2.75 q mols of diamine (2). The reaction temperature is 100° to 120° C, preferably 110° to 120° C. Since the reaction is exothermic it generally suffices to warm one reaction component, for example the diamine (2), to about 100° C and thereafter to allow the polyglycidyl ether to run in, in the course of which only slight temperature regulation is necessary. After a total of about 1 hour the reaction, which incidentally is appropriately carried out with exclusion of oxygen, can as a rule be regarded as complete. Appropriately, the organic solvent required for the second reaction stage is now added.

In the second reaction stage, any desired epoxy compounds (3) can be used, and here again the polyglycidyl ethers of polyphenols (1) are preferred. The quantity ratio for the second reaction stage is advantageously 1 epoxide group equivalent (3) per 3.8 to 4.2 amino group equivalents [(1) + (2)]

Possible organic solvents in the presence of which the second reaction stage takes place are primarily water-soluble organic solvents, and in particular appropriately those which are miscible with water in any desired proportions. As examples, dioxane, isopropanol, ethanol and methanol, ethylene glycol n-butyl ether and diethylene glycol mono-butyl ether may be mentioned.

At the same time it is however also possible to carry out the reaction in the presence of water-insoluble organic solvents, for example in hydrocarbons such as petrol, benzene, toluene and xylene; and halogenated hydrocarbons such as methylene chloride, methylene bromide, chloroform, carbon tetrachloride, ethylene chloride, ethylene bromide, s-tetrachlorethane and above all trichlorethylene.

The reaction is carried out in such a way that poly-addition products which are soluble or dispersible in water are produced, by ensuring, through addition of acid not later than after completion of the reaction, that a sample of the reaction mixture, diluted with water, shows a pH-value of 2 to 8, preferably 2 to 7, or especially of 5 to 7. For this purpose, inorganic or organic acids, and advantageously easily volatile organic acids such as formic acid or acetic acid, are for example used. Furthermore it is advisable to work at temperatures of at most 80° C, for example at 45° to 70° C. The solutions or dispersions thus obtained, which are mixed with acid and appropriately adjusted to a content of 10 to 30 percent of reaction product by means of an organic solvent or preferably by means of water, are distinguished by high stability.

They can be used for various purposes, above all in the textile industry. In particular, they are suitable for rendering wool non-felting, with the wool being impregnated with an aqueous liquor to which the preparation and, if desired, yet further additives such as wetting agents, dispersing agents and/or acid, have been added, and then being dried and subjected to a treatment at elevated temperature. However, the process for dyeing wool and rendering it non-felting, in which, using the exhaustion method, the wool is on the one hand dyed and on the other hand treated at temperatures of 35° to 100° C and a pH-value of 3 to 9 with the preparations according to the invention, in optional sequence, proves particularly advantageous. The dyeing and non-felting treatment can thereby be combined in a simple manner and carried out in the same apparatus without the wool being taken out of the apparatus between the two processes.

Dyeing can here be carried out in the customary manner which is in itself known, with any desired dyestuffs which can be used for wool, for example acid wool dyestuffs, 1:1- or 1:2-metal complex dyestuffs or reactive dyestuffs. Equally, the additives which are customary when dyeing wool can be employed, such as sulphuric acid, acetic acid, sodium sulphate, ammonium sulphate and levelling agents, possible levelling agents being above all polyglycol compounds of higher aliphatic amines, which can optionally also be quaternized and/or esterified at the hydroxyl groups by means of polybasic acids.

The liquor which serves for the non-felting treatment, in addition to containing the preparation of the polyaddition product, also contains the amount of acid required for establishing the acid medium. Preferably, however, the process is carried out in the weakly alkaline range, at pH-values of about 8 to 9, with ammonia or salts which react alkaline, for example trisodium phosphate, being added to the liquor. Furthermore, yet other salts such as sodium sulphate, ammonium sulphate or sodium thiosulphate can be used.

The amount of the reaction product according to the invention (not counting solvent and water), relative to the weight of the wool, is appropriately 0.5 to 5 percent. As has been mentioned, the process is carried out at temperatures of 35 to 100° C and between 20 and 80 minutes is mostly required for an extensive to practically complete fixing of the polyaddition product.

The sequence of the two processes is optional but in general it tends to be advantageous to dye first and then to carry out the non-felting treatment.

When using the preparations in combination with an aminoplast precondensate on textiles, especially cotton, a wash-resistant "soil release" effect is achieved. Using the preparations, it is also possible to impart a so-called non-iron finish to textiles.

Furthermore, dyestuffs, especially reactive dyestuffs, are well fixed to textiles, especially wool, with the aid of preparations which contain the present reaction products, and this expresses itself in an improved fastness to perspiration.

Furthermore, finishes using the present reaction products also improve the mechanical properties, for example tear strength, elongation at break, abrasion resistance, and tendency to pilling, of the treated textile material.

Additionally, the preparations are also suitable for use as hair setting agents and especially as paper sizing agents in the manufacture of paper. The reaction products prove advantageous above all in the manufacture of papers which contain calcium carbonate as a filler.

EXAMPLE 1

434 g (2.55 mols) of 1-amino-3-aminomethyl-3,5,5-trimethyl-cyclohexane are initially introduced into a stirred vessel and warmed at 100° C under nitrogen. 191 g (1 epoxide group equivalent) of an epoxide formed from 2,2-bis-(4'-hydroxyphenyl)-propane and epichlorohydrin (5.25 epoxide group equivalents/kg) are added over the course of 30 minutes whilst stirring, with the reaction temperature being kept at between 110° and 120° C. After a further 30 minutes at 110 to 120° C, 625 g of glycol monobutyl ether are added. After allowing the mixture to cool whilst stirring, a clear solution of medium viscosity is obtained. The amino group content of this solution is 3.73 equivalents/kg.

107.2 g (0.4 amino group equivalent) of the solution thus obtained are warmed to 50° C with good stirring. A solution of 19.1 g (0.1 epoxide group equivalent) of the epoxide of the composition indicated in the preceding paragraph, in 19.1 g of glycol monobutyl ether, is added dropwise over the course of 35 minutes. After a further 30 minutes' stirring at 50° C a sample gives a clear solution in dilute aqueous acetic acid. The reaction mixture is now diluted with a mixture of 24 g of glacial acetic acid and 170 g of water and further stirred until cold. A clear solution is obtained, having a solids content of 20 percent and a pH-value of 6.4.

EXAMPLE 2

206 g (1.8 mols) of 1-amino-2-aminomethyl-cyclopentane are reacted with 191 g (1 epoxide group equivalent) of the epoxide of the indicated composition, in the manner indicated in the 1st paragraph of Example 1. Thereafter 307 g of glycol monobutyl ether are added. The solution thus obtained has an amino group content of 4.38 equivalents/kg.

91.2 g (0.4 amino group equivalent) of this solution are warmed to 51°C whilst stirring. A solution of 19.1 g (0.1 epoxide group equivalent) of the epoxide of the composition indicated in the 1st paragraph of Example 1, in 19.1 g of glycol monobutyl ether, is now added dropwise over the course of 30 minutes. After a further 30 minutes stirring at about 50° C, a sample gives a clear solution in dilute aqueous acetic acid. The reaction mixture is diluted with a solution of 24 g of glacial acetic acid in 163 g of water and is further stirred until cold. The clear solution thus produced has a solids content of 20 percent and shows a pH-value of 6.4.

EXAMPLE 3

456 g (4 mols) of 1,2-diaminocyclohexane are initially introduced into a stirred vessel and warmed to 100° C under nitrogen. 382 g (2 epoxide group equivalents) of an epoxide formed from 2,2-bis-(4'-hydroxyphenyl)-propane and epichlorhydrin are added over the course of 30 minutes whilst stirring, with the reaction temperature being kept between 100° and 140° C. After a further 30 minutes at 100° to 120° C, 838 g of n-butylglycol are added. After allowing to cool whilst stirring, a clear solution of medium viscosity is obtained. The amino group content of this solution is 4.2 equivalents/kg.

95.5 g (0.4 amino group equivalent) of the solution thus obtained are warmed to 50° C internal temperature with good stirring. A solution of 19.1 g (0.1 epoxide group equivalent) of the epoxide of the composition indicated in the preceding paragraph, in 19.1 g of n-butylglycol, is added dropwise over the course of 30 minutes.

After a further 20 minutes stirring at 58° C a sample gives a clear solution in dilute aqueous acetic acid. The reaction mixture is now diluted with a mixture of 16 g of glacial acetic acid and 188 g of water and further stirred until cold. A clear solution is obtained, having a solids content of 20 percent and a pH-value of 7.0.

EXAMPLE 4

191 g of the amino compound described in Example 3 (0.8 amino group equivalent) are warmed to 50° C internal temperature with good stirring. A solution of 19.1 g (0.1 epoxide group equivalent) of the epoxide of the composition indicated in the 1st paragraph of Example 3, in 19.1 g of n-butylglycol, are then added dropwise over the course of 30 minutes. 20 minutes thereafter, a sample gives a clear solution in dilute aqueous acetic acid. The reaction mixture is now diluted with a mixture of 34 g of glacial acetic acid and 332 g of water and further stirred until cold. A clear solution is obtained, having a solids content of 20 percent and a pH-value of 7.0.

EXAMPLE 5

150 g of 4,4'-diamino-dicyclohexylmethane (0.713 mol) are initially introduced into a stirred vessel and warmed to 100° C under nitrogen. 53.5 g (0.25 epoxide group equivalent) of the epoxide described in Example 3 are added dropwise at this temperature over the course of 30 minutes, whilst stirring, with the reaction temperature being kept at between 100 and 120° C. After a further 30 minutes at 110° C, 203.5 g of n-butylglycol are added. The mixture is allowed to cool whilst stirring and a clear solution of medium viscosity is obtained. The amino group content of this solution is 3.55 amine equivalents/kg.

113 g (0.4 amino group equivalent) of the solution thus obtained are warmed to 50° C internal temperature with good stirring. A solution of 19.1 g (0.1 epoxide group equivalent) of the epoxide described above, in 19.1 g of n-butylglycol, is then added dropwise over the course of 30 minutes. After 1 hour, 24 g of glacial acetic acid and 203 g of water are added and the mixture is further stirred until cold. A clear solution is obtained, having a solids content of 20 percent and a pH-value of 6.4.

EXAMPLE 6

75 g of ethylenediamine (1.25 mols) together with 95.5 g (0.5 epoxide group equivalent) of the epoxide according to Example 3 are warmed for 1 hour to 120°–150° C. A clear substance of medium viscosity is obtained having an amine group content of 14.2 equivalents/kg.

70.4 g (1 amino group equivalent) of this product are dissolved in 70.4 g of n-butylglycol and warmed to 60° C internal temperature. A solution of 38.2 g of an epoxide according to Example 3 (0.2 epoxide group equivalent) and 40 g of butylglycol is then allowed to run in over the course of 30 minutes. After a further 30 minutes, 40 g of glacial acetic acid and 280 g of water are added and the mixture is further stirred until cold. A clear solution of low viscosity is obtained, having a solids content of 20 percent and a pH-value of 7.6.

EXAMPLE 7

146 g of triethylenetetramine (1 mol) together with 191 g (1 epoxide group equivalent) of an epoxide according to Example 3 are stirred for 1 hour at between 110° and 150° C. The mixture is then diluted with 337 g of n-butylglycol and further stirred until cold. A clear solution is obtained, having an amine group content of 10.3 equivalents/kg.

155.2 g of this solution (0.8 amino group equivalent) are warmed to 60° C internal temperature. 19.1 g (0.1 epoxide group equivalent) of an epoxide according to Example 3, dissolved in 100 g of n-butylglycol, are then allowed to run in over the course of 30 minutes. After a further 30 minutes, 24 g of glacial acetic acid and 149 g of water are then added and the mixture is further stirred until cold. A solution of low viscosity is obtained, having a solids content of 21.5 percent and a pH-value of 8.0.

The solution is now halved and 38.5 g of concentrated HCl are added, a pH-value of 2.0 being thereby obtained. The solids content is 18 percent.

EXAMPLE 8

130 g (0.76 mol) of 1-amino-3-aminomethyl-3,5,5-trimethyl-cyclohexane are initially introduced into a stirring vessel and warmed to 100°C under nitrogen. 57.3 g (0.3 epoxide group equivalent) of the epoxide described in Example 3 are added dropwise over the course of 30 minutes whilst stirring, with the reaction temperature being kept at between 110 and 120°C. After a further 30 minutes at 110° to 120° C, 187 g of n-butylglycol are added. A clear solution of medium viscosity is obtained. The amino group content of this solution is 4.0 equivalents/kg.

125 g of this solution (0.5 amino group equivalent) are warmed to 60° C internal temperature. A solution of 20.6 g of phthalic acid diglycidyl ester (0.125 epoxide group equivalent) in 50 g of n-butylglycol is now added dropwise over the course of 30 minutes. 30 minutes thereafter, 30 g of glacial acetic acid and 185 g of water are added and the mixture is further stirred until cold. A clear solution is obtained, having a solids content of 20 percent and a pH-value of 6.8.

EXAMPLE 9

217 g (1.275 mols) of 1-amino-3-aminomethyl-3,5,5-trimethyl-cyclohexane are initially introduced into a stirring vessel and warmed to 80° C under nitrogen. 80 g (0.5 epoxide group equivalent) of an epoxide of formula (2)

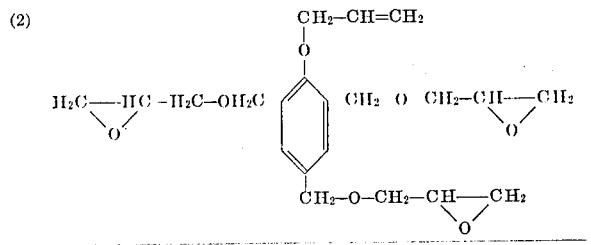

are added dropwise over the course of 1 hour whilst stirring. In the course thereof, the temperature rises to 112° C. Thereafter the internal temperature is raised to 120° C and the mixture is stirred for a further hour. Subsequently, 297 g of n-butylglycol are added and the mixture is further stirred until cold. The amino group content of this solution is 4.17 equivalents/kg.

120 g (0.5 amino group equivalent) of this solution are warmed to 60°C internal temperature. A solution of 20.6 g of phthalic acid diglycidyl ester (0.125 epoxide group equivalent) and 50 g of n-butylglycol is then added dropwise over the course of 30 minutes. After a further 30 minutes, 30 g of glacial acetic acid and 169 g of water are added and the mixture is further stirred until cold.

A clear solution of low viscosity is obtained, having a solids content of 20 percent and a pH-value of 6.7.

EXAMPLE 10

133 g (0.78 mol) of 1-amino-3-aminomethyl-3,5,5-trimethyl-cyclohexane are initially introduced into a stirring vessel and warmed to 100° C under nitrogen. 97 g (0.57 epoxide group equivalent) of the epoxide described in Example 3 are added dropwise over the course of 30 minutes whilst stirring, in the course of which the reaction temperature is kept at between 110 to 120° C. After a further 30 minutes at 110° to 120° C, 230 g of butylglycol are added. A solution of medium viscosity is obtained, having an amino group content of 3.31 equivalents/kg.

75.6 g (0.25 amino group equivalent) are warmed to 60° C internal temperature. A solution of 19.1 g (0.1 epoxide group equivalent) of an epoxide according to Example 3, in 50 g of n-butylglycol, is now allowed to run in over the course of 30 minutes. 30 minutes thereafter, 13.5 g of glacial acetic acid and 117 g of water are added and the mixture is further stirred until cold. A clear solution of low viscosity is obtained, having a solids content of 20 percent and a pH-value of 7.0.

EXAMPLE 11

125 g of the amino compound described in Example 8 are used, and the solution is warmed to 60° C internal temperature. A solution of 38.2 g (0.2 epoxide group equivalent) of an epoxide according to Example 3, in 100 g of n-butylglycol, is now added dropwise over the course of 30 minutes. 30 minutes thereafter, 27 g of glacial acetic acid and 221 g of water are added and the mixture is further stirred until cold. A clear solution of low viscosity is obtained, having a solids content of 20 percent and a pH-value of 7.0.

EXAMPLE 12

100 kg of wool yarn are dyed in a circulation apparatus, in a known manner, with a fast dyestuff, for example a reactive dyestuff or a 1:2-chromium or cobalt complex of an azo dyestuff. After finishing the dyeing, the wool is rinsed. In the course of this, 1,500 liters of water at 50° C are allowed to run in, and thereafter 12 kg of the solution of the adduct in glycol monobutyl ether, the manufacture of which is described in Example 1, are added. When this is uniformly distributed, a solution of 4 kg of trisodium phosphate in 20 liters of water is allowed to run in over the course of 15 minutes. After a further 20 minutes, 2 kg of a 12.5 percent strength aqueous solution of an addition product of 1 mol of octadecanol and 35 mols of ethylene oxide are still added, and the treatment is continued for 15 minutes. Finally, the material is thoroughly rinsed and dried for one hour at 60° to 80° C. The yarn is non-felting and shrink-resistant.

Similar results are achieved with the solution of the adduct of which the manufacture is described in Example 2.

EXAMPLE 13

100 kg of wool are first dyed in the customary manner with reactive dyestuffs in a hank yarn dyeing apparatus. After finishing the dyeing, the material is thoroughly rinsed. A fresh treatment bath of 4,000 liters of water is then prepared at 40° C.

2 kg of 25 percent strength ammonia are then added to this bath, followed, after 5 minutes, by 8 kg of preparation manufactured according to Example 7. A stable emulsion forms in the bath, which is uniformly absorbed on the wool in about 30 minutes. 20 kg of hydrogen peroxide are then further added to the bath, followed, after 15 minutes, by 2 kg of 12.5 percent strength aqueous solution of an addition product of 1 mol of octadecanol and 35 mols of ethylene oxide. After a further 15 minutes, the material is twice rinsed cold. After drying, the wool is non-felting according to IWS Standard Specifications 7B and 7C.

Similar results are achieved with the preparations according to Examples 3, 4, 5, 6, 8 and 9.

EXAMPLE 14

100 kg of bleached sulphite pulp are ground in a hollander in the customary manner and subsequently run out into a mixing vessel. 20 kg of calcium carbonate, to act as a filler, are added in the mixing vessel. After the filler has thoroughly dispersed in the pulp suspension, 0.3 to 0.7 percent of the product according to Example 10, relative to pulp and solids content, are added. The pulp mixture passes to the papermaking machine via further stages of the process of paper manufacture. In order to increase the filler retention, a retention agent can be added briefly before running out the pulp.

Papers manufactured with this or a similar pulp composition are predominantly used as writing papers and printing papers and show excellent fastness to inks, which is a consequence of the good sizing.

Aluminium sulphate which is introduced into this system in lesser or greater amounts through the conjoint use of scrap paper, does not in any way interfere with the sizing.

In this system, the calcium carbonate can also be replaced by commercial kaolin. The sizing action is the same as when using calcium carbonate. Papers which contain calcium carbonate as the filler and which cannot be sized with conventional sizing agents have the advantage that they have good opacity and whiteness, as well as good printing ink absorption.

EXAMPLE 15

100 kg of unbleached sulphate pulp are ground in a hollander in the customary manner and subsequently run out into a mixing vessel. 0.3 to 0.5 percent of the product according to Example 11, relative to pulp and solids content, are added. After thorough mixing, the pulp mixture is passed to the paper making machine.

The papers thus manufactured in various gram weights, are suitable for use as wrapping papers. The achievable sizing effects are in most cases better than those achievable with conventional resin sizing.

We claim:

1. A process for the manufacture of stable preparations of reaction products of epoxides and amines, characterized in that (1) a polyglycidyl ether of a polyphenol, which is liquid at room temperature, is reacted with (2) an aliphatic di-primary diamine, in a ratio of 1 epoxide group equivalent to 3 – 5.5 amino group equivalents, in the absence of solvents, at temperatures of 100° to 120° C, that thereafter the resulting adduct is allowed to react further, at temperatures below 100° C, in the presence of an organic solvent, with (3) a 1,2-polyepoxy compound in a ratio of 1 epoxide group equivalent to two to five amino group equivalents and that provision is made, by addition of acid, not later than after completion of the reaction, that a sample of the reaction mixture has a pH-value of 2 to 8 after dilution with water.

2. Process according to claim 1 characterized in that a cycloaliphatic or cycloaliphatic-aliphatic di-primary diamine, in which at least one of the primary amino groups is bonded to a cycloaliphatic ring carbon atom, is used as the diamine (2), and that the further reaction is carried out with (3) a 1,2-epoxide compound in a ratio of 1 epoxide group equivalent to three to tive amino group equivalents, and that provision is made, by addition of acid not later than after completion of the reaction, that a sample of the reaction mixture has a pH-value of 2 to 7 after dilution with water.

3. Process according to claim 1 characterized in that a polyglycidyl ether of 2,2-bis-(4'-hydroxyphenyl)-propane, which is liquid at room temperature, is employed as the polyglycidyl ether(1).

4. Process according to claim 1 characterized in that the polyglycidyl ether has an epoxide content of at least 5 epoxide group equivalents per kg.

5. Process according to claim 1 characterized in that a di-primary diamine (2) is used which apart from the two amine nitrogen atoms only contains carbon and hydrogen, and which possesses a saturated 5-membered to 6-membered carbocyclic ring, a $H_2N-$ group bonded to a ring carbon atom and a $H_2N-CH_2-$ group bonded to another ring carbon atom.

6. Process according to claim 1 characterized in that 3,5,5-trimethyl-1-amino-3-aminomethyl-cyclohexane or 1-amino-2-amino-methyl-cyclopentane is used as the di-primary amine (2).

7. Process according to claim 1 characterized in that a solvent which is infinitely miscible with water is used as the solvent for the second reaction stage.

8. Process according to claim 1 characterized in that the quantity ratio of the reagents in the second reaction stage is 1 epoxide group equivalent to 3.8 – 4.2 amino group equivalents.

9. Process according to claim 1 characterized in that the temperature of the second reaction stage is 40° to 60° C.

10. Process according to claim 1 characterized in that the pH-value of the preparation is established with low molecular aliphatic carboxylic acids.

11. The stable preparation which contains a reaction product of
   1. a polyglycidyl ether of a polyphenol, which is liquid at room temperature, and
   2. an aliphatic di-primary diamine, the ratio of epoxide group equivalents to amino group equivalents being 1:3 to 1:5.5, the reaction being carried out in the absence of a solvent and at 100° to 120° C, and thereafter further reacting the resulting adduct with (3) a 1,2-polyepoxy compound the ratio of epoxide equivalents to amino group equivalents being 1:2 to 1:5, with the provision, that no later than after completion of the reaction the pH-value of the reaction mixture is adjusted by addition of acid so that a sample of the reaction mixture has a pH-value of 2 to 8 after dilution with water.

12. A process according to claim 1 characterized in that a polyglycidyl ether of 2,2-bis-(4'-hydroxyphenyl)-propane, which is liquid at room temperature, is employed as the polyglycidyl ether (3).

13. A process according to claim 1 characterized in that epoxy compound (3) comprises a polyglycidyl ether which has an epoxide content of at least 5-epoxide group equivalents per kg.

* * * * *

PO-1050
(5/69)

UNITED STATES PATENT OFFICE
CERTIFICATE OF CORRECTION

Patent No. 3,673,558  Dated June 27, 1972

Inventor(s) Rosemarie Toepfl et al

It is certified that error appears in the above-identified patent and that said Letters Patent are hereby corrected as shown below:

Cover page, after the Inventors and before "[22]"

insert ---Assignors to CIBA-GEIGY AG, Basel, Switzerland---.

Signed and sealed this 11th day of June 1974.

(SEAL)
Attest:

EDWARD M. FLETCHER, JR.
Attesting Officer

C. MARSHALL DANN
Commissioner of Patents